United States Patent
Kaledhonkar et al.

(10) Patent No.: US 10,135,940 B2
(45) Date of Patent: Nov. 20, 2018

(54) SUBSCRIBING TO EVENT NOTIFICATIONS USING OBJECT INSTANCES

(71) Applicant: Oracle International Corporation, Redwood Shores, CA (US)

(72) Inventors: Vikram Kaledhonkar, Fremont, CA (US); Allan George Schrum, Bozeman, MT (US)

(73) Assignee: Oracle International Corporation, Redwood Shores, CA (US)

( * ) Notice: Subject to any disclaimer, the term of this patent is extended or adjusted under 35 U.S.C. 154(b) by 202 days.

(21) Appl. No.: 14/960,171

(22) Filed: Dec. 4, 2015

(65) Prior Publication Data

US 2017/0163752 A1 Jun. 8, 2017

(51) Int. Cl.
*G06F 15/16* (2006.01)
*H04L 29/08* (2006.01)
*H04L 29/06* (2006.01)

(52) U.S. Cl.
CPC .............. *H04L 67/26* (2013.01); *H04L 67/02* (2013.01); *H04L 67/42* (2013.01); *G06F 2201/86* (2013.01)

(58) Field of Classification Search
CPC ......... H04L 67/02; H04L 67/26; H04L 67/42; G06F 2201/86
USPC .................. 709/202–203, 227–228; 719/318
See application file for complete search history.

(56) References Cited

U.S. PATENT DOCUMENTS

| | | | | |
|---|---|---|---|---|
| 7,051,032 | B2 * | 5/2006 | Chu-Carroll | G06F 17/2247 707/E17.124 |
| 7,089,307 | B2 * | 8/2006 | Zintel | H04L 67/02 709/203 |
| 7,389,339 | B1 * | 6/2008 | Dobberpuhl | G06F 17/302 709/224 |
| 8,499,035 | B2 * | 7/2013 | Roach | H04L 67/24 709/203 |
| 2003/0046395 | A1 * | 3/2003 | Fleming | G06F 9/542 709/226 |
| 2004/0143659 | A1 * | 7/2004 | Milliken | H04L 29/06 709/224 |
| 2006/0200488 | A1 * | 9/2006 | Chu-Carroll | G06F 17/2247 707/E17.124 |
| 2008/0184270 | A1 * | 7/2008 | Cole | H04L 67/306 719/318 |
| 2010/0057849 | A1 * | 3/2010 | Ji | H04L 41/0681 709/203 |
| 2015/0127723 | A1 * | 5/2015 | Lawson | H04L 67/02 709/203 |
| 2015/0207813 | A1 * | 7/2015 | Reybok | G06F 21/552 726/22 |

* cited by examiner

*Primary Examiner* — Bharat N Barot
(74) *Attorney, Agent, or Firm* — Kraguljac Law Group, LLC

(57) ABSTRACT

A method of handling event subscriptions and notifications may include receiving a request from a client system to subscribe to an event type, and receiving a template from the client system. The template may define data that should be returned to the client system when an event of the event type occurs. In response to the event of the event type occurring, the method may also include packaging data associated with the event according to the template received from the client system to generate an event notification. The method may further include sending the event notification to the client system.

20 Claims, 11 Drawing Sheets

SUBSCRIBING TO EVENT NOTIFICATIONS USING OBJECT INSTANCES

BACKGROUND

When two applications communicate using event subscription messaging in a Simple Object Access Protocol (SOAP) architecture, one application is defined as an event producer, while the other application is defined as an event receiver or an event subscriber. In most cases, the event producer will be a server-based web service, and the event subscriber will be a client subscribing to events generated by the web service. Typically, there will be many event subscribers for each event producer, and while each event subscriber will want to be notified of a particular event type, each event subscriber may potentially need data related to the event in different formats and configurations particular to each client system. The industry standard mechanism is for each client system to receive the same data packet from the event producer. Each client system must then use filters and expressions that are grammar-specific to reformat and filter the data as necessary.

BRIEF SUMMARY

In some embodiments, a method of handling event subscriptions and notifications may include receiving, at a server, a request from a client system to subscribe to an event type and receiving, at the server, a template from the client system. In some embodiments, the template may define data that should be returned to the client system when an event of the event type occurs. In response to the event of the event type occurring, the method may also include packaging, by the server, data associated with the event according to the template received from the client system to generate an event notification. The method may additionally include sending, from the server, the event notification to the client system.

In some embodiments, a non-transitory, computer-readable medium may include instructions which, when executed by one or more processors, cause the one or more processors to perform operations including receiving, at a server, a request from a client system to subscribe to an event type, and receiving, at the server, a template from the client system. In some embodiments, the template may define data that should be returned to the client system when an event of the event type occurs. In response to the event of the event type occurring, The operations may also include packaging, by the server, data associated with the event according to the template received from the client system to generate an event notification. The operations may additionally include sending, from the server, the event notification to the client system.

In some embodiments, a system may include one or more processors and one or more memory devices that include instructions which, when executed by the one or more processors, cause the one or more processors to perform operations including receiving, at a server, a request from a client system to subscribe to an event type, and receiving, at the server, a template from the client system. In some embodiments, the template may define data that should be returned to the client system when an event of the event type occurs. In response to the event of the event type occurring, The operations may also include packaging, by the server, data associated with the event according to the template received from the client system to generate an event notification. The operations may additionally include sending, from the server, the event notification to the client system.

In various implementations of the embodiments described above, one or more of the following features may be included in any combination and without limitation. The template may include an instance of an object. The instance of the data object may include a plurality of data fields. The method/operations may also include determining, by the server, and after receiving the template, which of the plurality of data fields of the instance of the data object are assigned non-null values. The request from the client system to subscribe to the event type may include an instance of a data object comprising a plurality of data fields that define how a subscription is handled by the server. The plurality of data fields may include a reference to a data object for the template. The event type in the request from the client system may be defined by the template. The server may be part of a web service.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
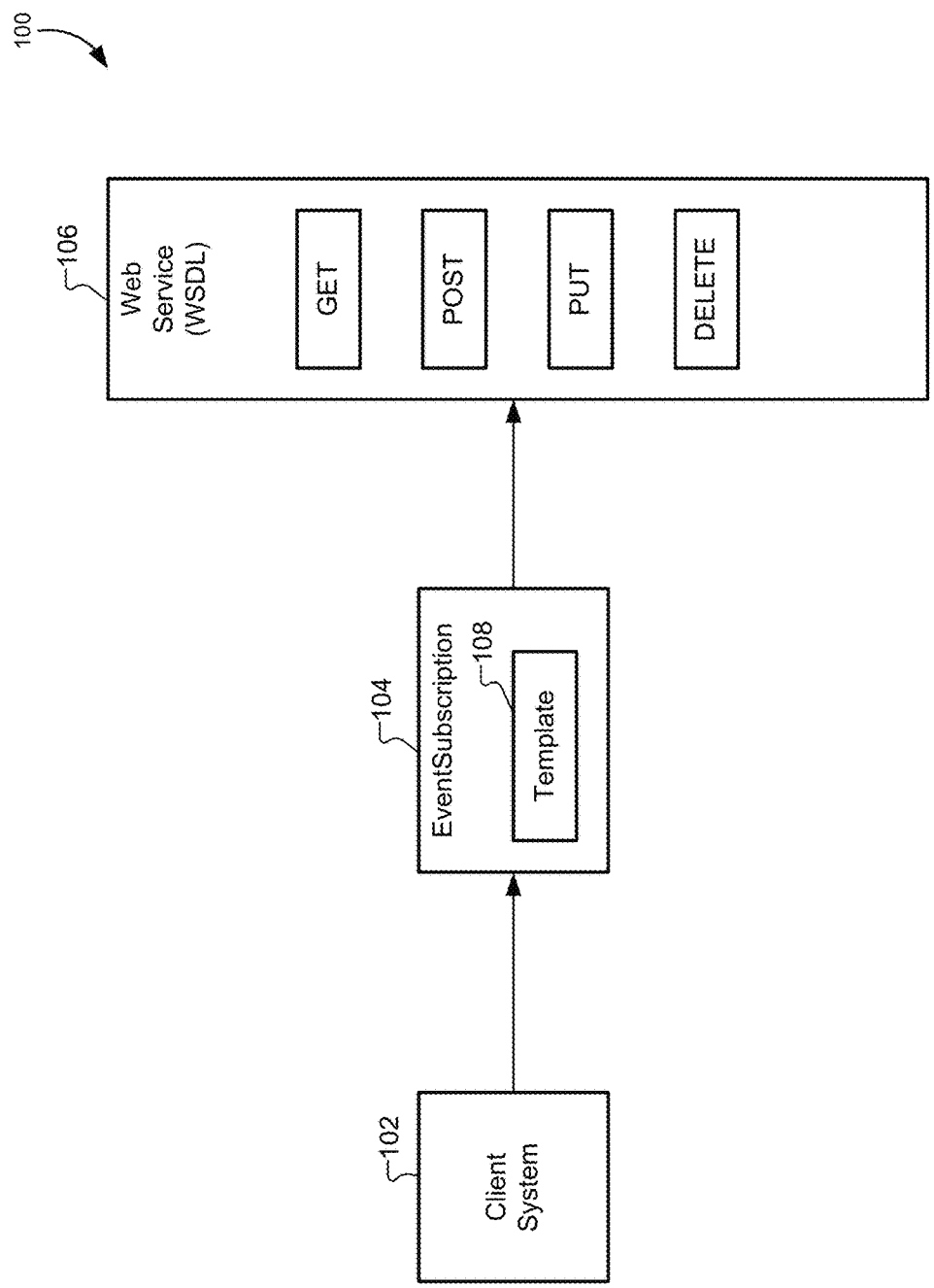
FIG. 1 illustrates a simplified block diagram of a system for subscribing to an event using a template, according to some embodiments.

Described herein, are embodiments for providing template objects to an event provider in order to select and format the type of data returned in an event notification. Event subscribers can send an event subscription object to the event provider, typically through a web service interface. The template object itself can provide two types of information to the event provider. First, the type of the template object can define the type of data to be monitored by the event provider. Data types of the template objects can be be used to identify similar server-side data collections such that updates to the identified server-site data generate event notifications sent to the event subscriber. Second, the data fields defined in the template object can specify which data fields should be returned by the event provider along with the format of the data.

In traditional event subscriber/provider systems, the event subscribers subscribe to events generated by the event provider. For example, a web service may provide access to a data collection. This data collection may be accessible through Representational State Transfer (REST) protocol operations (e.g., create, update, read, and delete) provided by the web service. A subscribable event may include any time a member of the data collection is created, updated, or deleted. By subscribing to this type of event, event subscribers can maintain a consistent version of the data collection provided by the web service on their local systems or otherwise respond to these events. When an event occurs, the event provider can iterate through a list of client systems that have subscribed to the event. For each client system, the event provider can send an event notification that (1) indicates that the event has occurred, and (2) provides information describing the event. For example, a client system may use the web service to update a member of the data collection. When this update occurs, an event may be triggered at the web service server. The server can iterate through a list of client systems that have subscribed to an "update" event, and send an event notification to each subscriber client system. The event notification will indicate to the client system that a member of the data collection has been updated, and will typically include a description of any changes made.

This traditional provider/subscriber paradigm results in a number of technology-related problems. In subscribing to an event type, event subscribers are often at the mercy of the event provider when it comes to the type and amount of data returned with the event notification. Data provided by the event notification may be too much or too little, depending on the needs of the event subscriber. When receiving the event notification, the event subscriber is often required to filter and reformat any data received before it can be used. Other solutions also include complex grammatical filtering expressions that must be written in a language and grammar that is commonly understood by the event provider and the event subscriber. On the server side, the event provider often must provide full data objects to every event subscriber. Objects and data collections provided by web services are often complex and lengthy. Each object may include complex sub-objects, such as lists, arrays, tables, and other data structures that are transmitted in their entirety to each event subscriber. For each event, transmitting full data objects dramatically increases the time it takes to service the event, increases the amount of network bandwidth required to transmit the event notifications to the set of subscribed client systems, and increases the load on the web service server.

The embodiments described herein address these and other technical problems by allowing event subscribers to narrowly define the data that is sent by the event provider. According to these embodiments, the event subscribers can look up an object template provided by each event subscriber when an event occurs. The template for each subscriber can be used to select the data provided by the event provider in a way that is unique to each event subscriber. In testing these embodiments in real-world web services, these techniques have been shown to dramatically decrease the network bandwidth required to respond to mass-subscribed events. On the client side, event subscribers are able to receive an event notification with the data packaged in a data object that was originally provided by the event provider as an object template. This allows the event subscribers to quickly use event notification information without needing to filter or reformat the data into a recognizable object or format.

As used herein, the terms "event subscriber" and "client system/device" may be used interchangeably to describe any computer system or computing environment that subscribes to an event. The term "event provider" may be used to describe any computer system or computing environment that receives event subscriptions and provides event notifications to event subscribers. An "event provider" may be used interchangeably with a "web service" in certain examples throughout this disclosure. Although a web service is used as an exemplary event provider, an event provider may also include database management systems, enterprise applications, websites, Web servers, and so forth.

FIG. 1 illustrates a simplified block diagram 100 of a system for subscribing to an event using a template, according to some embodiments. The client system 102 may access the data collection through a web service 106. The web service 106 may present a public interface written in a Web Service Description Language (WSDL). By way of example, the web service 106 in FIG. 1 provides traditional CRUD operations (create, update, read, and delete) to access a data collection stored by the Web server. Of course, other web services may provide many different types of data-accessing operations through their web interfaces, and the embodiments described below are equally applicable to these and other types of web interfaces that are well-known in the art. Web services in all embodiments also are not required to provide access the data collections. Somewhat services may simply provide information, such as a current time, weather forecast, sports scores, stock market prices, and so forth.

In order to subscribe to one of the event types monitored by the web service 106, the client system 102 may send an EventSubscription object 104 to the web service 106. The EventSubscription object 104 may include many different fields that describe how the web service 106 should respond to the event, including a network address to which the response should be sent, a creation time, any credentials required to access the web service 106, and so forth. The EventSubscription object 104 may also include a template object 108 as one of its data members. Exemplary implementations and formats of the template object 108 will be described in greater detail below, but in general the template object 108 may include data members that align with data stored by the web service 106. By defining those data members in the template object 108, the client system 102 can specifically subscribe to events related to the template object 108 and request information defined by the data members of the template object 108.

Figure 2:
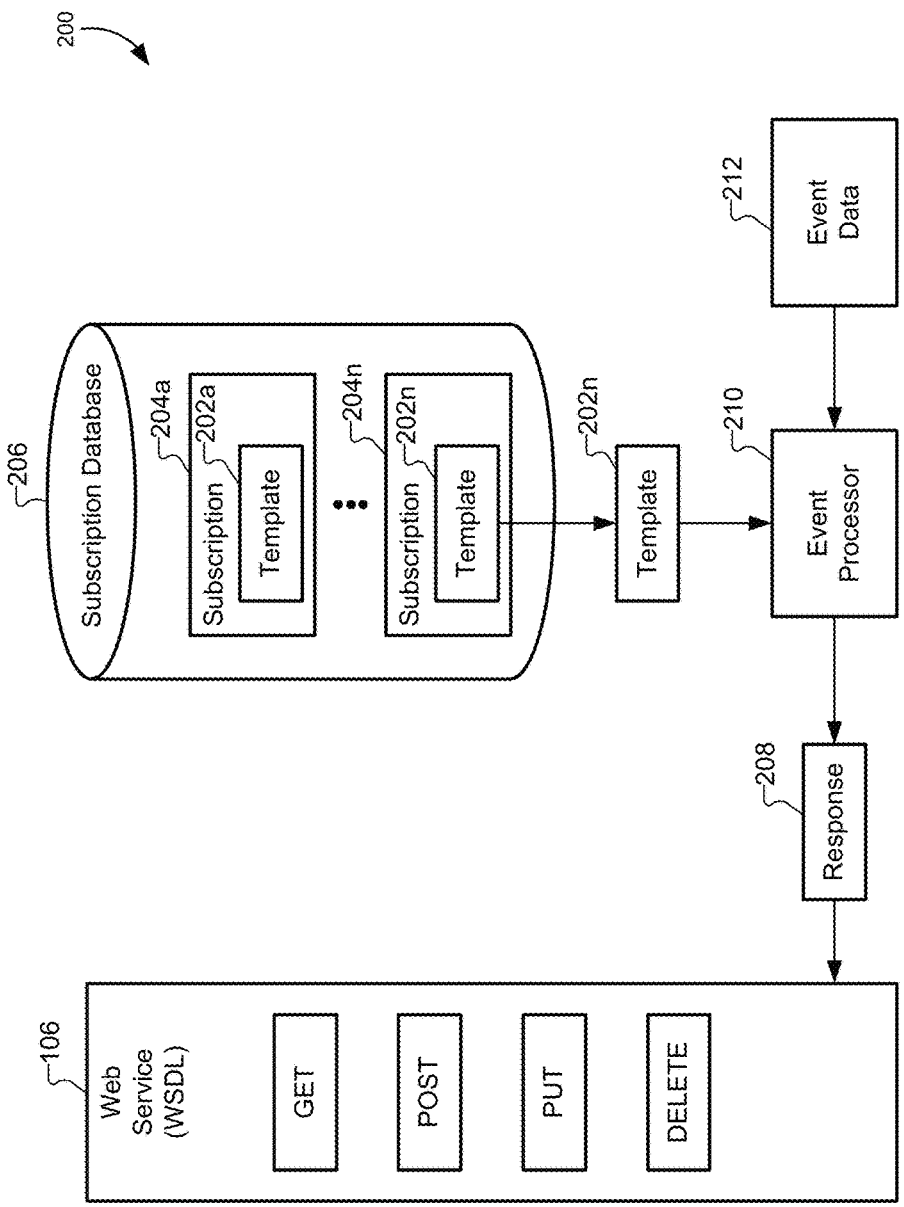
FIG. 2 illustrates a simplified block diagram of a system for storing event subscriptions and processing events in accordance with templates, according to some embodiments.

FIG. 2 illustrates a simplified block diagram 200 of a system for storing event subscriptions and processing events in accordance with templates, according to some embodiments. After receiving the EventSubscription object 104 from the client system 102, the web service 106 can store subscription information in a subscription database 206. The subscription database 206 may include a table that includes each subscription 204 with the data entry for each template 202. For example, the template 202 may be stored as an XML string in a column of a table and the database, and each subscription 204 may occupy a row of the same table. Separate tables in the subscription database 206 may be used for each event type. Alternatively or additionally, a single table may be used to store subscriptions, with a column in the table defining the event type. In some embodiments, a data type of the template 202 can define the type of event being subscribed to. Particular examples of template types will be discussed in greater detail below.

When an event is generated, the web service 106 may respond by generating event data 212. For example, if the web service 106 provides access to a data collection, a member of the data collection may be updated through a POST operation of the web service 106. Updating a member of the data collection may generate an event, and event data 212 may include information about the particular data member that was updated. Prior to this disclosure, many event providers would simply send the entirety of the event data 212 to each event subscriber.

In these embodiments, the web service 106 can query the subscription database 206 for a list of client systems are subscribed to this particular event type. In some environments, the subscription database 206 may include separate database tables for each event type, such that an event processor 210 can simply iterate through the entirety of a database table assigned to the current event being serviced. As the event processor 210 iterates through the list of subscribed client systems, the template 202 for each subscriber can be accessed from the subscription database 206. The event processor 210 can generate a response 208 by filtering the event data 212 based on the template 202 for each subscriber. Specifically, the event processor 210 can extract data fields from the event data 212 that match data fields defined by the template 202 while ignoring data fields in the event data 212 that are absent from the template 202 or undefined in the template 202. The event processor 210 can then package the event data 212 according to the template 202 into a data object for the subscriber. In some embodiments, a portion of the event data 212 can be packaged into a data object that is identical or similar to a data object used by the client system to originally subscribe to the event. The data object can be packaged in a response 208, such as an EventNotification object, and sent to the subscriber. As the event processor 210 iterates through the list of subscribers, individual responses can be generated for each client system as dictated by their individual templates 202.

Figure 3:
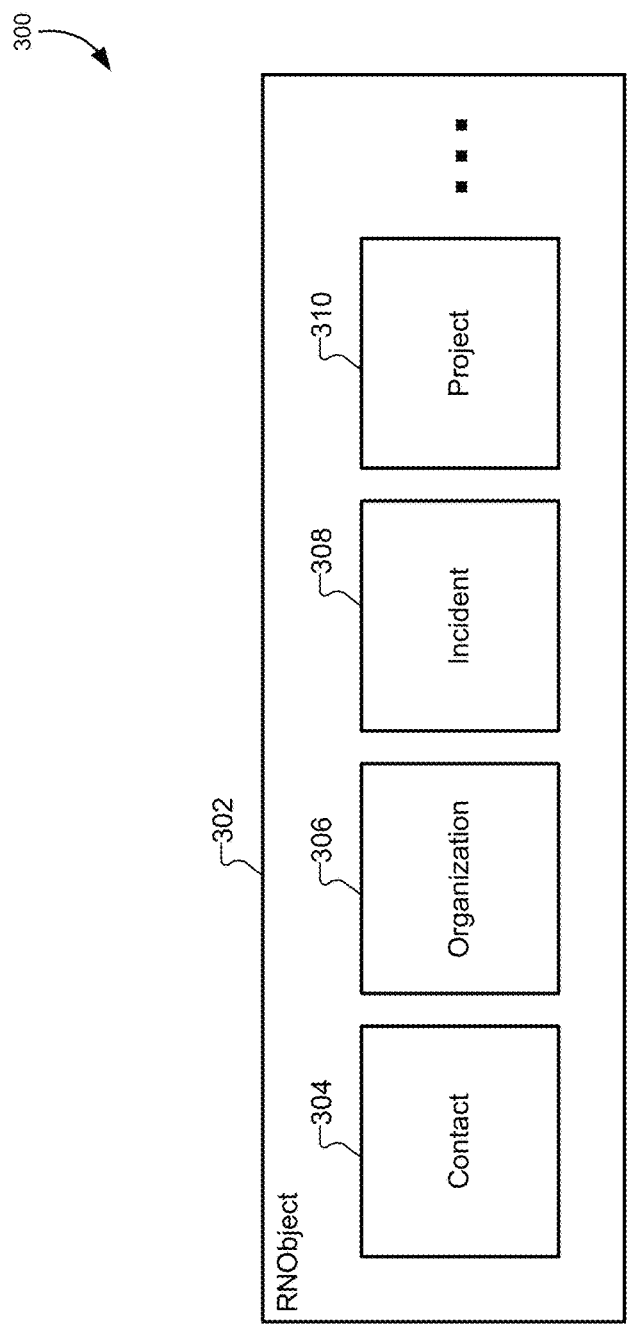
FIG. 3 illustrates a simplified block diagram of an exemplary template data structure hierarchy, according to some embodiments.

FIG. 3 illustrates a simplified block diagram 300 of an exemplary template data structure hierarchy, according to some embodiments. As described above, the EventSubscription object 104 of FIG. 1 may have a number of data fields that are defined by the event subscriber during the registration process. One such data field may be the template object used by the event provider to format and select data for the EventNotification object. In some embodiments, the template data field may also be referred to as an ObjectShape object, as it describes the "shape", or characteristics of the object to be returned by the EventNotification.

In order to provide a flexible framework for dynamically adding and deprecating event types throughout the software lifecycle, each of available template objects may be derived from the same parent object. FIG. 3 illustrates the parent object as an RNObject 302, which would be the class of object required for the template, or ObjectShape. Defining the template may then include instantiating an object that inherits from the RNObject 302. Child object classes can be defined for each data type managed by the web service. In the example of FIG. 3, child object classes such as contact 304, organization 306, incident 308, project 308, and so forth, can each represent types of object collections managed by the web service. For example, the contact 304 class may represent contact information, and may include phone numbers, emails, names, titles, etc., for each contact. By instantiating a particular child class of the RNObject 302, the client system can inherently define the type of data event to be subscribed to by the EventSubscription object 104.

Figure 4:
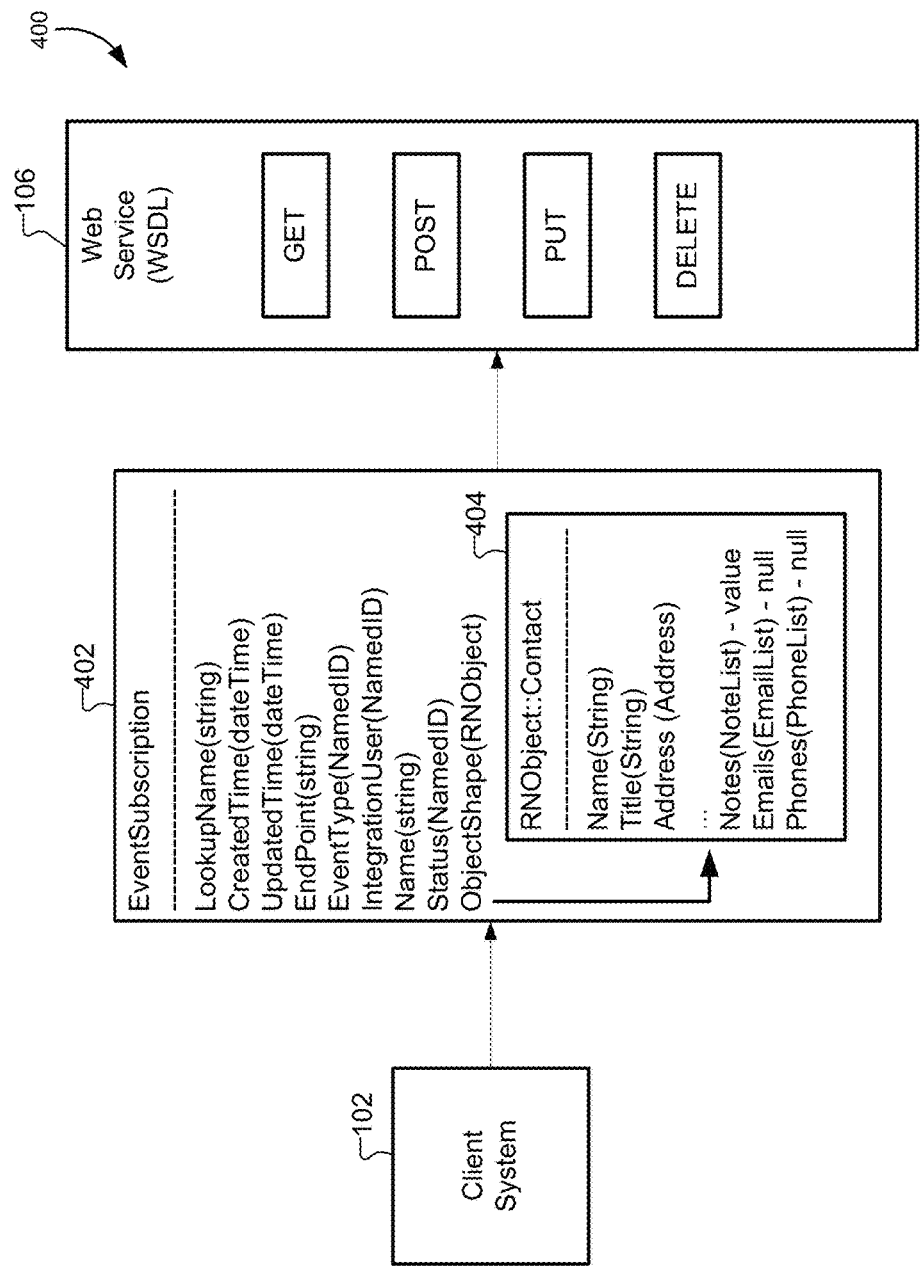
FIG. 4 illustrates a simplified block diagram of a data structure for subscribing to an event, according to some embodiments.

FIG. 4 illustrates a simplified block diagram 400 of a data structure for subscribing to an event, according to some embodiments. In this particular example, a new EventSubscription object 402 can be instantiated by the client system 102 and sent to the web service 106 in order to subscribe to an event related to the updating, creation, and/or deletion of a contact object in a collection of contacts managed by the web service 106. The EventSubscription object 402 may include data members such as a LookupName and ID for the EventSubscription object 402, a CreatedTime and an UpdatedTime for record keeping, an EndPoint defining a URL where the event notification should be posted, an EventType specifying whether create, update, and/or destroy event types should be subscribed, an IntergrationUser that supplies credentials and a connection method to use for the event subscription, and/or a unique Name and Status.

Additionally, the ObjectShape field may include an instantiation of a child class of the parent RNObject. In this particular example, an instantiation of the child "Contact" class is included in the EventSubscription object 402 as a template. The contact object 404 can serve a number of different purposes after being sent to the web service 106. In some embodiments, the contact object 404 may first define the type of object being monitored by the web service 106. For example, the web service 106 can determine the class of the template object as the "Contact" class using features available in many programming languages, such as the getClass( ) function in Java. Thus, simply by virtue of the object type of the template, the web service 106 can subscribe the client system 102 to one of many available event types.

In some embodiments, the contact object 404 can also define the type of data returned when a contact is updated/created/destroyed. For simple scalar values, such as integers, strings, characters, Boolean values, and so forth, a value does not need to be specified in the contact object 404 in order to have those values returned in response to an event. Because these values are typically very small, there is very little overhead with providing these values in every event that is reported. This may also include simple objects with basic accessor functions, such as Address.city, Address.street, and so forth. Therefore, these simple data members do not require any definition or assigned value in the contact object 404 being used as the template, as they may always be returned. On the other hand, complex data fields, such as lists, arrays, enumerations, collections, and/or other complex sub objects, may require some indication from the client system 102 that these complex values should be returned in response to an event. These are typically values that are much larger than simple scalars, and thus require more network bandwidth to transmit and more processing time on the web service server to process and package. In the example of FIG. 4, the "Emails" list and the "Phones" list are both assigned a null or default value indicating that the associated list of emails and the list of phone numbers should not be returned in response to a create/update/destroy event involving a contact. In contrast, the "Notes" list does have a "NoteList" object instantiated and assigned to the "Notes" data member of the contact object 404 being used as the template. This indicates to the web service 106 that the associated "Notes" for a contact should be returned with the EventNotification when an event is triggered for a contact.

It will be understood that the specific data structures and class types described for the contact subscription are merely exemplary and not meant to be limiting. The detail provided by FIG. 4, along with that of the subsequent figures discussed below, is discussed only to provide an enabling disclosure. In light of this disclosure, one having skill in the art would be able to design custom data structures and object types to perform the inventive template subscription mechanism described herein for many different types of computer systems. For example, a database management system providing stock market data may subscribe client systems to events such as price movements on particular stocks, and thus provide a "Stock" object to be used as a template by the client systems that could be used to selectively retrieve information related to the particular stock in response to an event. In short, the particular datatypes and data structures will be unique to each implementing computer system and environment, but would be within the skill of the ordinary programmer without undue experimentation in light of this disclosure.

Figure 5:
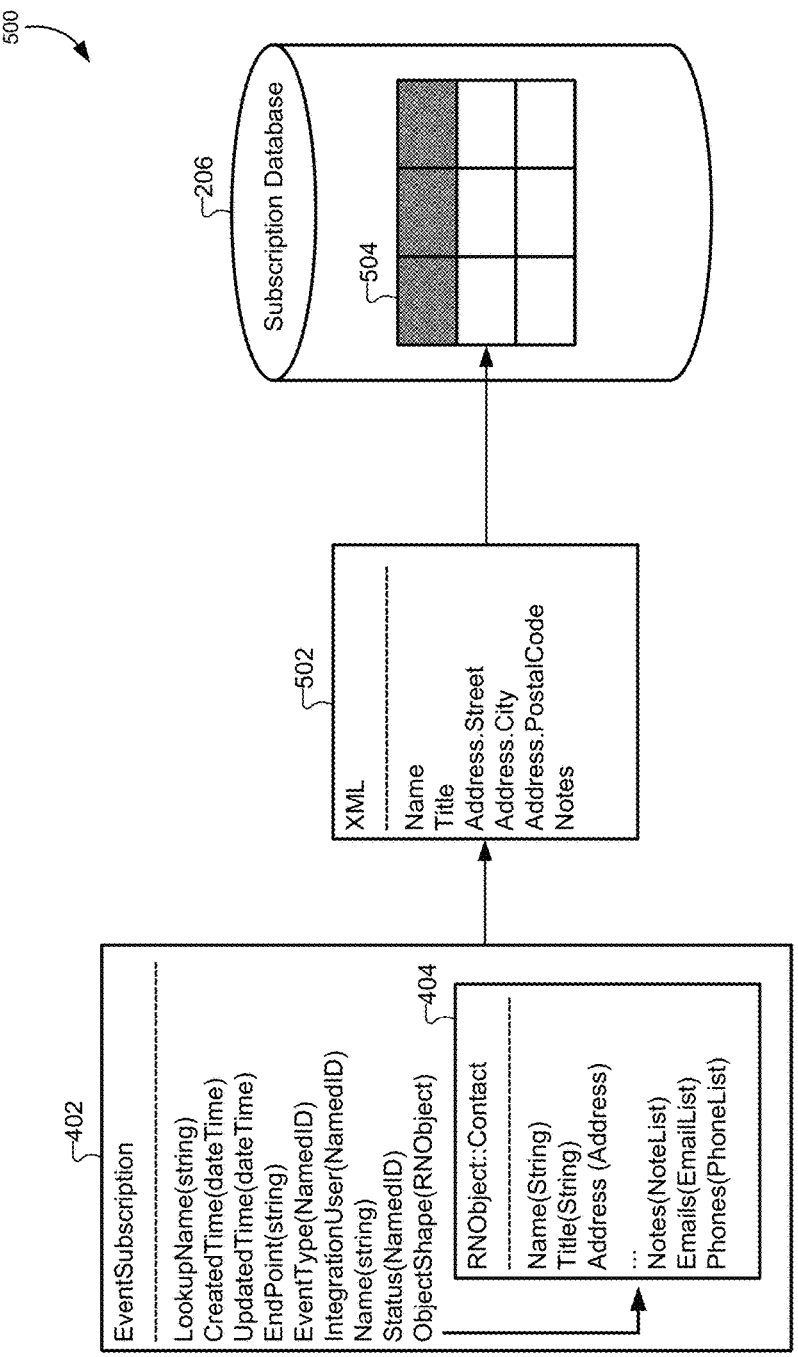
FIG. 5 illustrates a simplified block diagram of a data structure for storing templates in a subscription database, according to some embodiments.

FIG. 5 illustrates a simplified block diagram 500 of a data structure for storing templates in a subscription database, according to some embodiments. When the web service 106 receives the EventSubscription object 402 with the contact object 404 template, this information can be stored in the subscription database 206. Internally, the contact object 404 can be converted into an XML string and stored as a column in the database in the row for that EventSubscription object 402 or event subscriber. The XML string 502 need not contain any information specific to a specific contact record. Instead, the XML string 502 only needs to store a template of the data values that need to be sent. In some embodiments, the simple data members of the template can be omitted from the XML string 502 since they will always be provided when an event is generated. In other embodiments, both simple and complex data members from the template can be included in the XML string 502. In the example of FIG. 5, an XML string 502 simply stores names of the data fields of the template object that should be populated with event data when an event is triggered. Whenever an event is triggered on an object (a contact in this case), the event provider can read the record from the subscription database 206 for each subscribed client system and render the event information into a template object by populating the data fields specified by the XML string 502.

Figure 6:
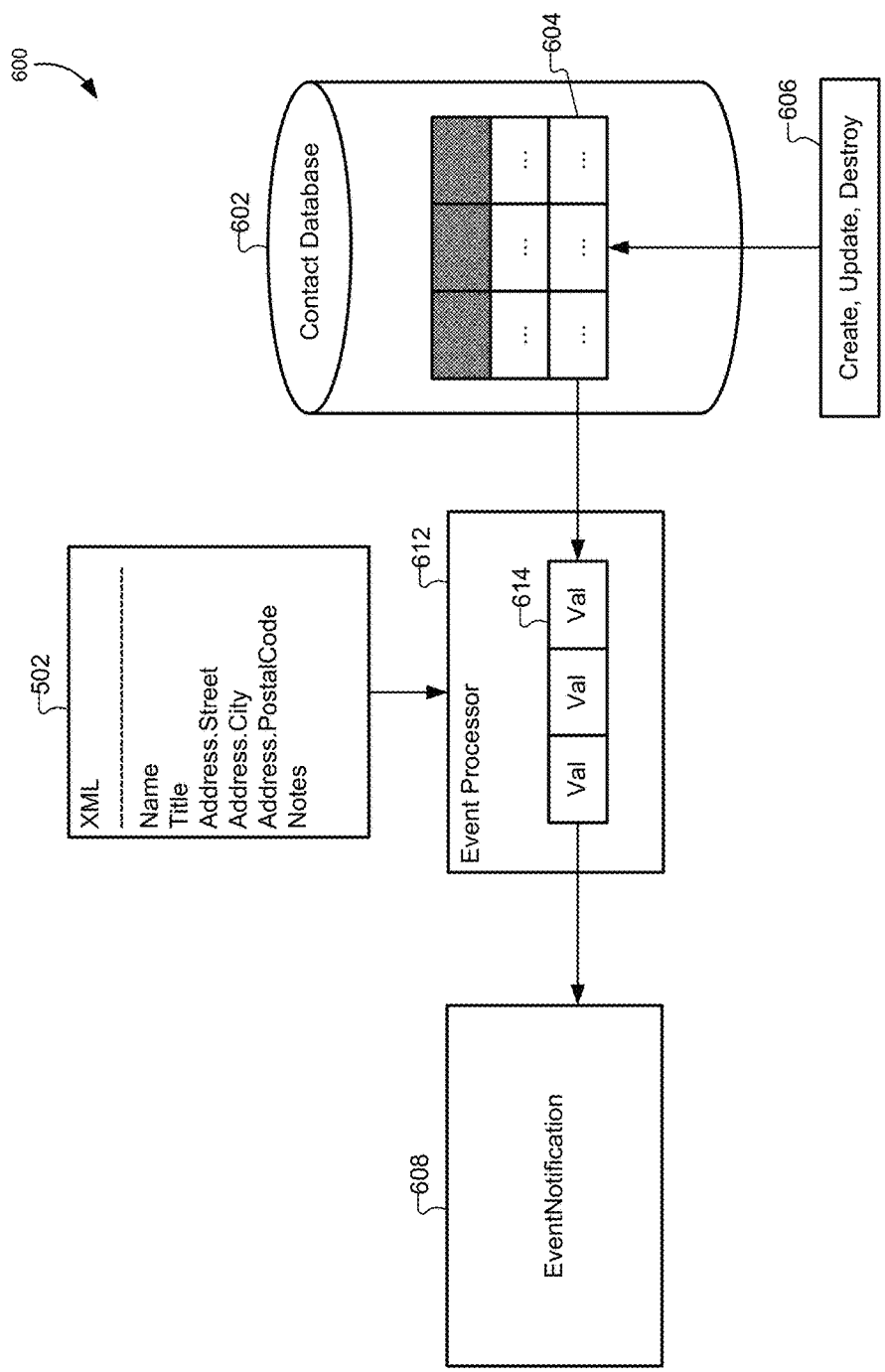
FIG. 6 illustrates a simplified block diagram of a system for parsing template fields when providing an event notification, according to some embodiments.

FIG. 6 illustrates a simplified block diagram 600 of a system for parsing template fields when providing an event notification, according to some embodiments. Continuing with the example of a contact object from above, an event may be triggered when a create/update/destroy event 606 is performed on an object in a contact database 602. When a row 604 in the contact database 602 is updated by the event 606, the contact database 602 can send information related to the event to the event processor 612. For example, the contact database 602 can send a set of values 614 read from columns of the contact database 602 for that particular contact. In some embodiments, the contact database need only send identifying information for the contact and values that were affected by the event 606. In some embodiments, all data related to the contact may be sent to the event processor 612.

The event processor 612 can then iterate through a list of event subscribers from the subscription database 206. For each event subscriber, the event processor 612 may read the XML string 502 from the database row assigned to the event subscriber, and then format the set of values 614 for the contact according to the XML string 502. For example, the event processor 612 may extract data values defined by the XML string 502 and generate a new contact object to encapsulate the data. The event processor 612 can leave out any contact information that is not specified by the external string, such as the email list and the phones list of the contact object.

Figure 7:
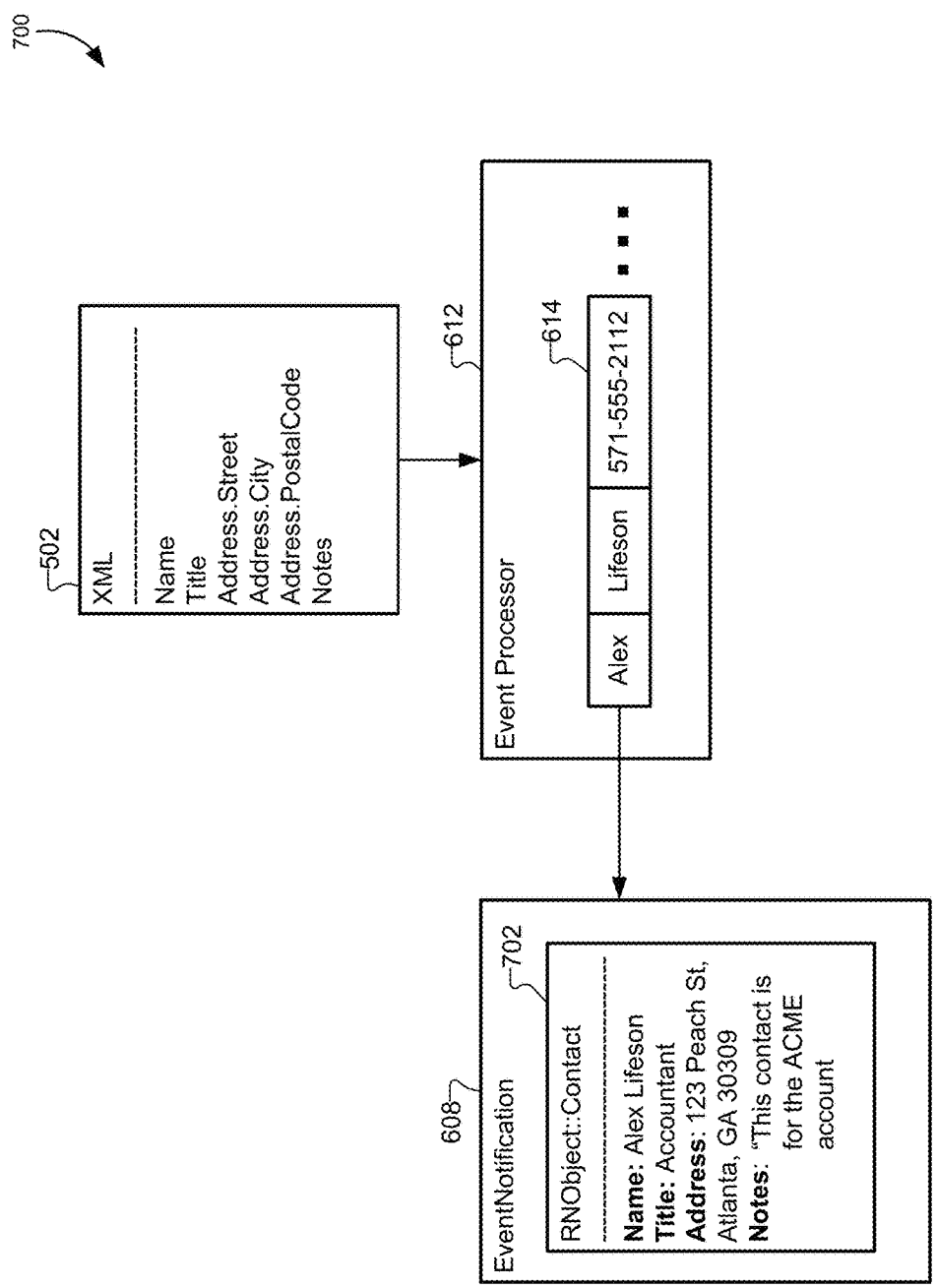
FIG. 7 illustrates a simplified block diagram of a resulting data structure in an event notification based on template parsing, according to some embodiments.

FIG. 7 illustrates a simplified block diagram 700 of a resulting data structure in an event notification based on template parsing, according to some embodiments. The event processor 612 has received data regarding a specific contact (i.e., "Alex Lifeson"). The XML string 502 for a particular event subscriber specifies that the complex "Notes" list be populated, but that other complex data members, such as the "Phones" list, be omitted. The event processor 612 can take the values from the columns of the contact database 602 and populate the data members of a newly instantiated contact object 702. The contact object 702 can be packaged into the EventNotification 608 and sent to the event subscriber.

The framework described above for subscribing to events and handling event notifications is also easily extensible to go beyond the examples discussed above. New datatypes added to a web service will usually have an associated data object class that encapsulates relevant information. So long as this class is compatible with the template class (e.g., descended from the RNObject class in the examples above) then the new data object class can be added to an EventSubscription sent to the event provider. Thus, on the event-subscriber side, no real changes are needed in order to support new data types and event types. At the web service, the WSDL supporting a new data type also does not need to change, meaning that any client-side proxy code that handles the WSDL can remain the same. Only the application-level client code may need to change to support sending the new object classes when creating an EventSubscription. On the server side, adding support for new datatypes and events would mostly include metadata changes to the event processor. The event provider may flag a new object type as being "subscribe-able", which would allow changes to database records related to that object type to generate events. In response to an event, the event processor may follow the same process of reading the subscription database, generating an instance of the data object, populating the data members using the XML string, and adding the data object to an EventNotification message.

Figure 8:
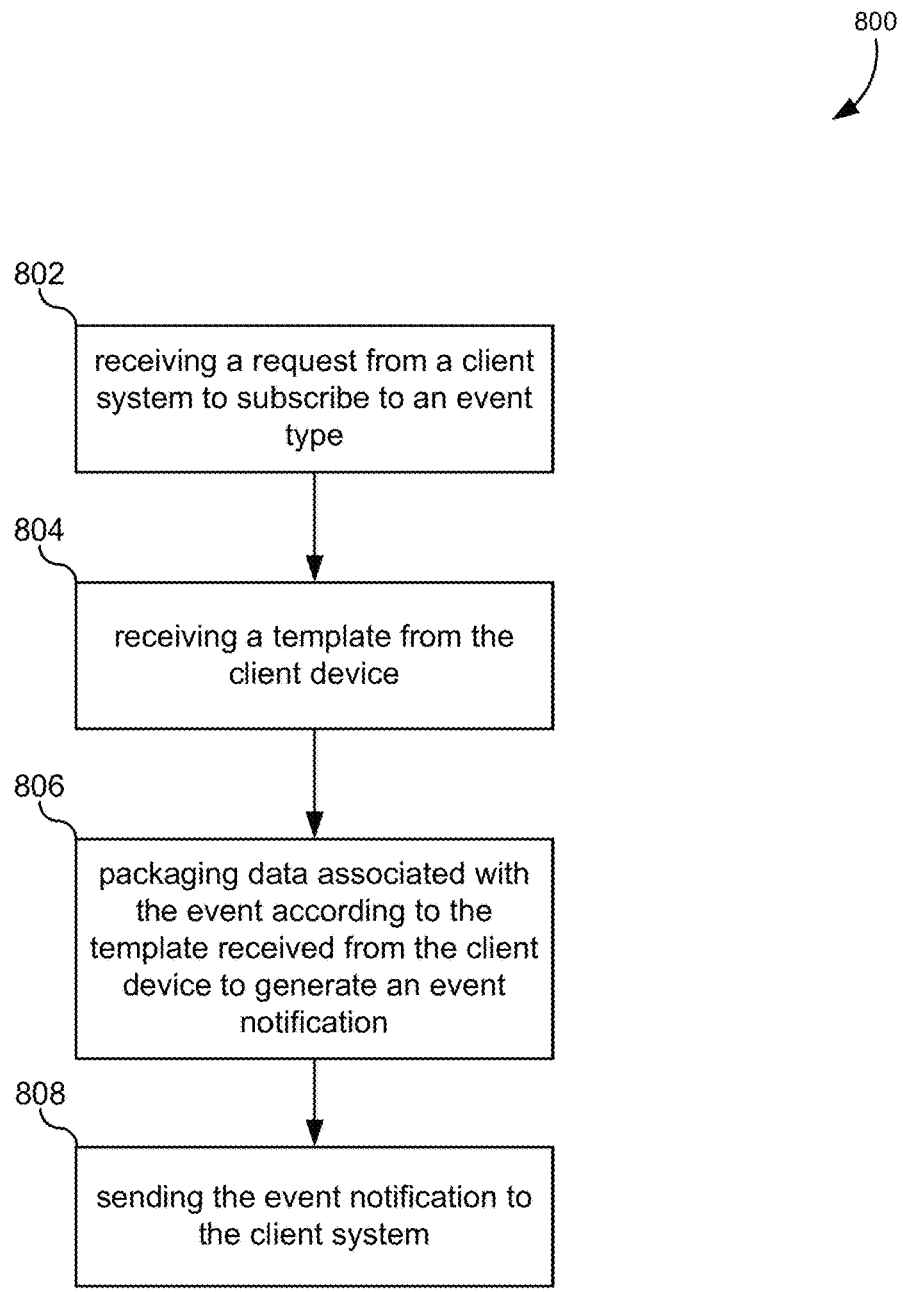
FIG. 8 illustrates a simplified flowchart of a method for handling event subscriptions and notifications, according to some embodiments.

FIG. 8 illustrates a simplified flowchart 800 of a method for handling event subscriptions and notifications, according to some embodiments. The method may include receiving, at a server, a request from a client system to subscribe to an event type (802). The request may include a plurality of data fields that define how the subscription is handled by the server, such as and EndPoint, and IntegrationUser, a Status, and so forth, as described above. The request may be received from an event subscriber, such as a client system, and the server may be part of a web service or other type of event provider.

The method may also include receiving a template from the client system (804). The template may define data that should be returned to the client system when an event of the specified event type occurs. The event type may include, for example, CRUD operations performed on a data type indicated by the template. The event type may be defined by the template, for example, by virtue of a class type of an object of the template. In some embodiments, the template may comprise an instance of an object. The instance of the object may include a plurality of data fields. Some of the data fields may be simple data fields, such as scalar values or objects with simple accessor methods. Some of the data field may be complex data fields, such as lists, arrays, collections, enumerations, and so forth. Complex data fields may be assigned a non-null or non-default value to indicate that they should be returned in an event notification.

The method may additionally include packaging data associated with the event according to the template received from the client system to generate an event notification (806). The data may be packaged by retrieving information regarding an object that was affected by the event, such as a contact object that is updated/deleted/created. Template information, such as an XML string described above, may be used to generate a new instance of an object defined by the template. The template may then be used to filter the information available for the event and populate only a subset of data fields in the object to be returned to the event subscriber. The method may further include sending the event notification to the client system (808).

It should be appreciated that the specific steps illustrated in FIG. 8 provide particular methods of handling event subscriptions and notifications according to various embodiments of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 9:
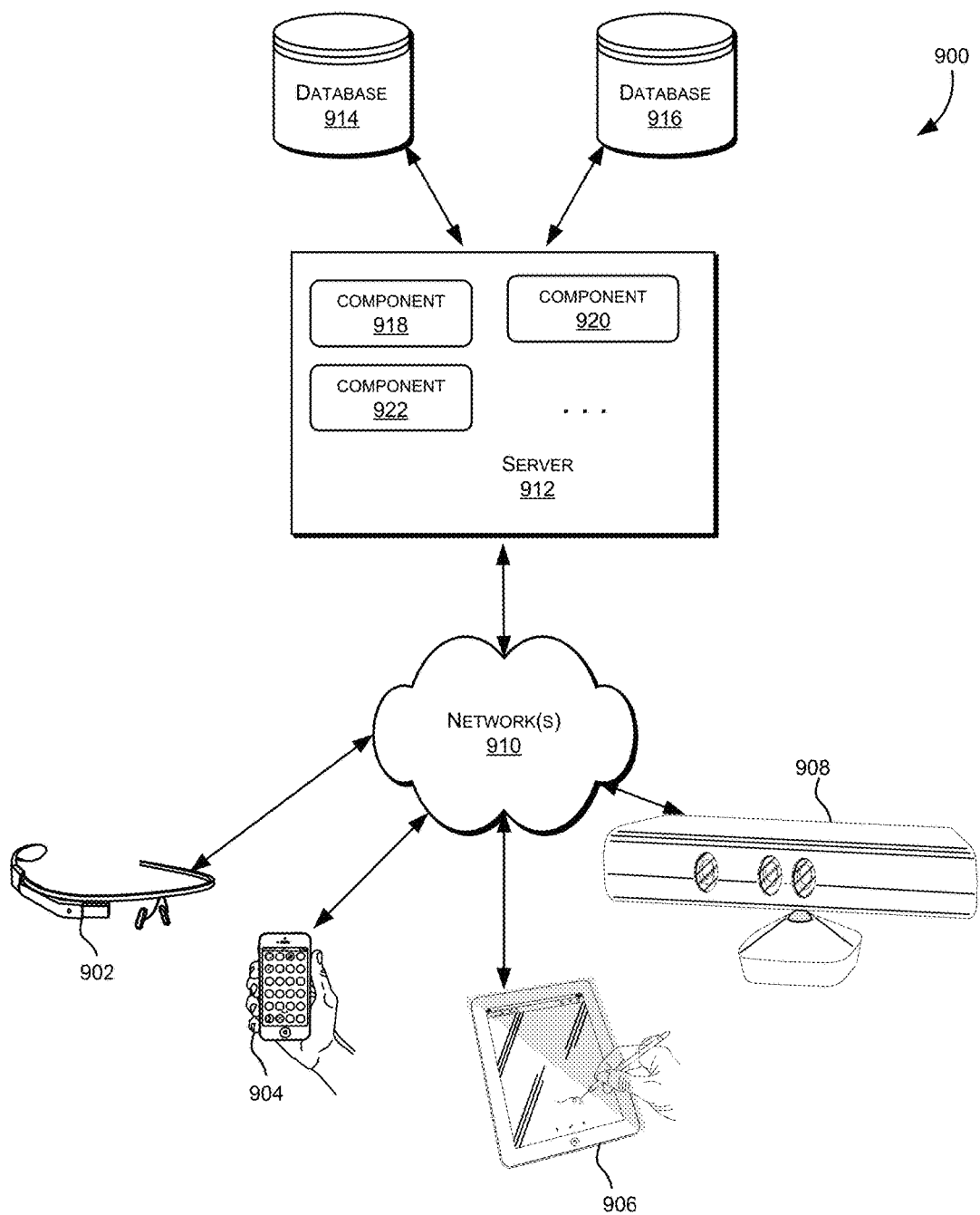
FIG. 9 illustrates a simplified block diagram of a distributed system for implementing some of the embodiments.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
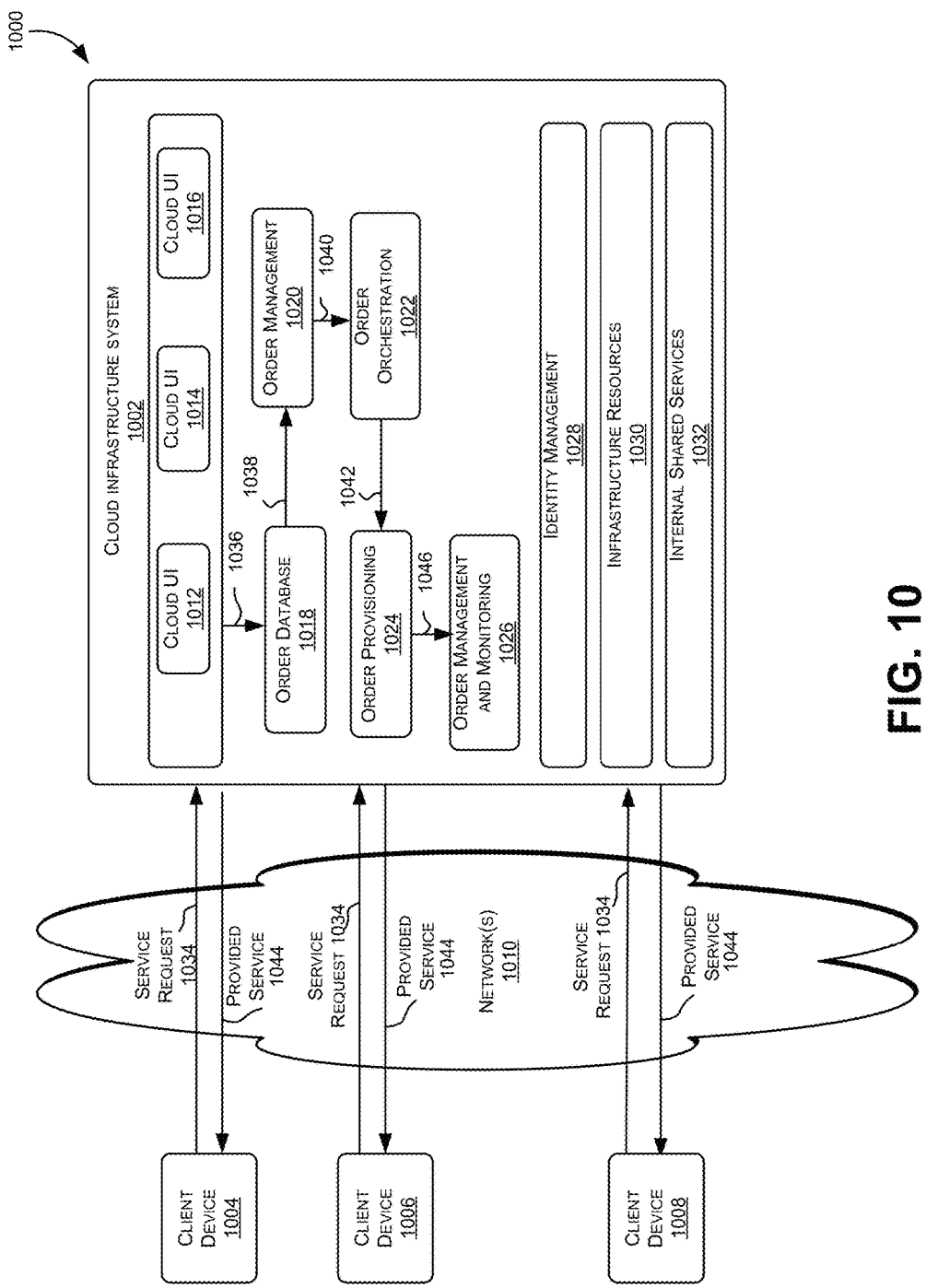
FIG. 10 illustrates a simplified block diagram of components of a system environment by which services provided by the components of an embodiment system may be offered as cloud services.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 910.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
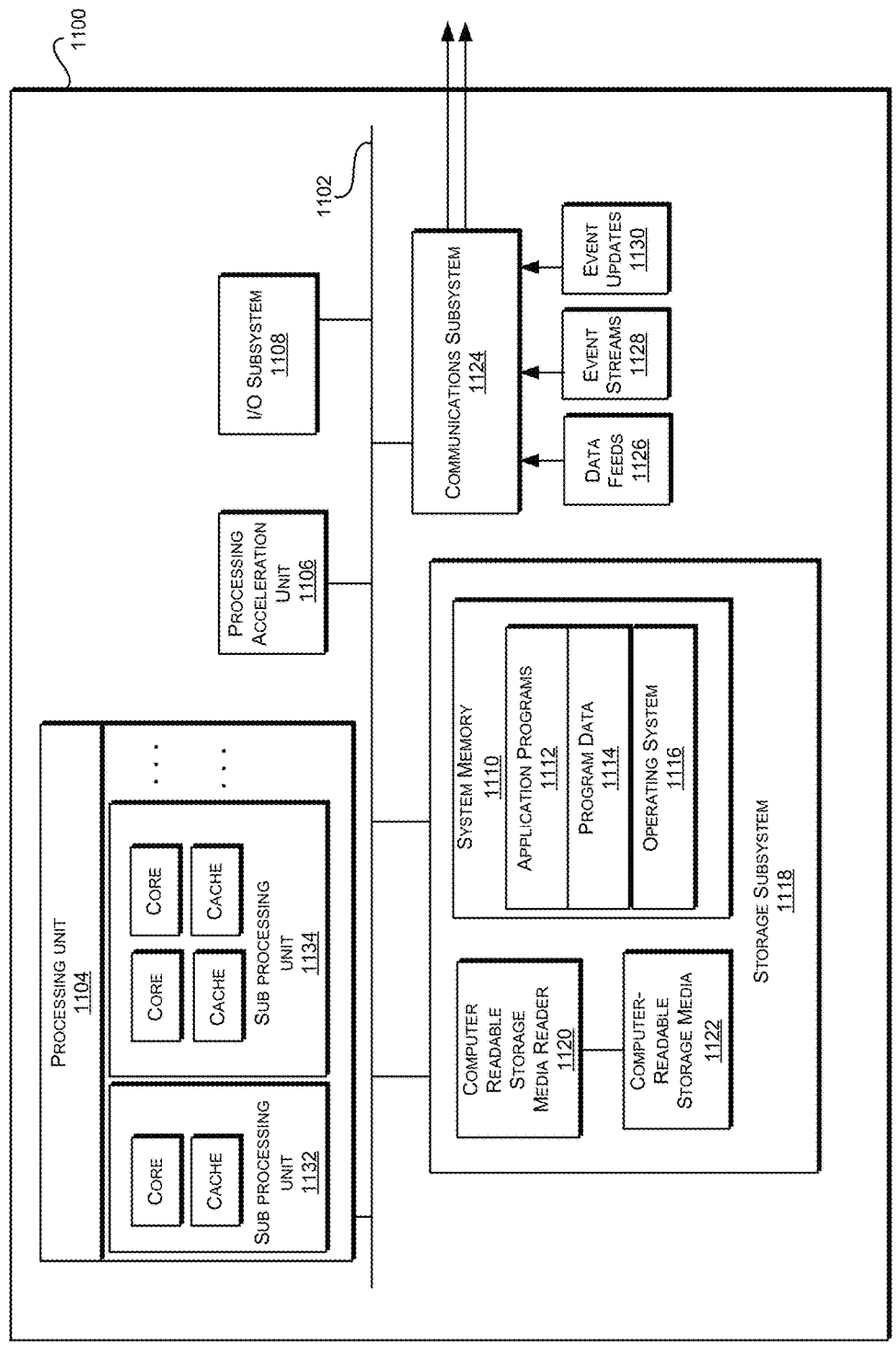
FIG. 11 illustrates an exemplary computer system, in which various embodiments may be implemented.

FIG. 11 illustrates an exemplary computer system 1100, in which various embodiments of the present invention may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of handling event subscriptions and notifications, the method comprising:
   receiving, at a server, a request from a client system to subscribe to an event type;
   receiving, at the server, a template from the client system, wherein the template comprises a first instance of an object type comprising a plurality of data fields that defines data that should be returned to the client system when an event of the event type occurs;
   in response to the event of the event type occurring, packaging, by the server, data associated with the event according to the template received from the client system to generate an event notification comprising a second instance of the object type with the plurality of data fields populated by the data associated with the event; and
   sending, from the server, the event notification to the client system.

2. The method of claim 1, wherein the object type is one of a plurality of object types that are stored in collections by the server.

3. The method of claim 2, wherein the event type is determined at the server by matching the object type of the first instance of the object in the template to one of the collections stored by the server.

4. The method of claim 1, further comprising:
   determining, by the server, and after receiving the template, which of the plurality of data fields of the instance of the data object are assigned non-null values and only populating complex data types in the response if they have corresponding non-null values in the template.

5. The method of claim 1, wherein the plurality of data fields define how a subscription is handled by the server, and wherein the plurality of data fields comprises a reference to a data object for the template.

6. The method of claim 1, further comprising:
   determining, by the server, and after receiving the template, which of the plurality of data fields of the instance of the data object are assigned null values and populating simple data types in the response even if they have null values in the template.

7. The method of claim 1, wherein the server is part of a web service.

8. A non-transitory, computer-readable medium comprising instructions which, when executed by one or more processors, cause the one or more processors to perform operations comprising:
   receiving, at a server, a request from a client system to subscribe to an event type;
   receiving, at the server, a template from the client system, wherein the template comprises a first instance of an object type comprising a plurality of data fields that defines data that should be returned to the client system when an event of the event type occurs;
   in response to the event of the event type occurring, packaging, by the server, data associated with the event according to the template received from the client system to generate an event notification comprising a second instance of the object type with the plurality of data fields populated by the data associated with the event; and
   sending, from the server, the event notification to the client system.

9. The non-transitory, computer-readable medium according to claim 8, wherein the object type is one of a plurality of object types that are stored in collections by the serve.

10. The non-transitory, computer-readable medium according to claim 9, wherein the event type is determined at the server by matching the object type of the first instance of the object in the template to one of the collections stored by the server.

11. The non-transitory, computer-readable medium according to claim 8, wherein the instructions cause the one or more processors to perform additional operations comprising:

determining, by the server, and after receiving the template, which of the plurality of data fields of the instance of the data object are assigned non-null values and only populating complex data types in the response if they have corresponding non-null values in the template.

12. The non-transitory, computer-readable medium according to claim 8, wherein the plurality of data fields define how a subscription is handled by the server, and wherein the plurality of data fields comprises a reference to a data object for the template.

13. The non-transitory computer-readable medium according to claim 8, further comprising:
   determining, by the server, and after receiving the template, which of the plurality of data fields of the instance of the data object are assigned null values and populating simple data types in the response even if they have null values in the template.

14. The non-transitory computer-readable medium according to claim 8, wherein the server is part of a web service.

15. A system comprising:
   one or more processors; and
   one or more memory devices comprising instructions which, when executed by the one or more processors, cause the one or more processors to perform operations comprising:
      receiving, at a server, a request from a client system to subscribe to an event type;
      receiving, at the server, a template from the client system, wherein the template comprises a first instance of an object type comprising a plurality of data fields that defines data that should be returned to the client system when an event of the event type occurs;
      in response to the event of the event type occurring, packaging, by the server, data associated with the event according to the template received from the client system to generate an event notification comprising a second instance of the object type with the plurality of data fields populated by the data associated with the event; and
      sending, from the server, the event notification to the client system.

16. The system of claim 15, wherein the object type is one of a plurality of object types that are stored in collections by the server.

17. The system of claim 16, wherein the event type is determined at the server by matching the object type of the first instance of the object in the template to one of the collections stored by the server.

18. The system of claim 15, wherein the instructions cause the one or more processors to perform additional operations comprising:
   determining, by the server, and after receiving the template, which of the plurality of data fields of the instance of the data object are assigned non-null values and only populating complex data types in the response if they have corresponding non-null values in the template.

19. The system of claim 15, wherein the plurality of data fields define how a subscription is handled by the server, and wherein the plurality of data fields comprises a reference to a data object for the template.

20. The system of claim 15, wherein the instructions cause the one or more processors to perform additional operations comprising:
   determining, by the server, and after receiving the template, which of the plurality of data fields of the instance of the data object are assigned null values and populating simple data types in the response even if they have null values in the template.

\* \* \* \* \*

UNITED STATES PATENT AND TRADEMARK OFFICE
CERTIFICATE OF CORRECTION

PATENT NO.       : 10,135,940 B2
APPLICATION NO.  : 14/960171
DATED            : November 20, 2018
INVENTOR(S)      : Kaledhonkar et al.

Page 1 of 1

It is certified that error appears in the above-identified patent and that said Letters Patent is hereby corrected as shown below:

In the Specification

In Column 1, Line 49, delete "The operations" and insert -- the operations --, therefor.

In Column 1, Line 65, delete "The operations" and insert -- the operations --, therefor.

In Column 3, Line 7, delete "be be" and insert -- be --, therefor.

In the Claims

In Column 22, Line 58, in Claim 9, delete "serve." and insert -- server. --, therefor.

Signed and Sealed this
Fifth Day of November, 2019

Andrei Iancu
*Director of the United States Patent and Trademark Office*